United States Patent
Lambert

(10) Patent No.: US 12,510,437 B2
(45) Date of Patent: Dec. 30, 2025

(54) SYSTEM FOR ASSISTING IN DETERMINING A FINAL OPTICAL PRESCRIPTION FOR A SUBJECT AND ASSOCIATED METHOD

(71) Applicant: LUNEAU TECHNOLOGY OPERATIONS, Pont de l'Arche (FR)

(72) Inventor: Frederic Albert André Lambert, Houville-la-Branche (FR)

(73) Assignee: LUNEAU TECHNOLOGY OPERATIONS, Pont de l'Arche (FR)

( * ) Notice: Subject to any disclaimer, the term of this patent is extended or adjusted under 35 U.S.C. 154(b) by 159 days.

(21) Appl. No.: 18/261,909

(22) PCT Filed: Jan. 19, 2022

(86) PCT No.: PCT/EP2022/051127
§ 371 (c)(1),
(2) Date: Jul. 18, 2023

(87) PCT Pub. No.: WO2022/157195
PCT Pub. Date: Jul. 28, 2022

(65) Prior Publication Data
US 2024/0077379 A1  Mar. 7, 2024

(30) Foreign Application Priority Data
Jan. 20, 2021 (FR) ...................................... 2100523

(51) Int. Cl.
*G01M 11/02* (2006.01)
*G06K 15/02* (2006.01)

(52) U.S. Cl.
CPC .... *G01M 11/0228* (2013.01); *G01M 11/0207* (2013.01); *G06K 15/1859* (2013.01)

(58) Field of Classification Search
CPC .......... G01M 11/0228; G01M 11/0207; G06K 15/1859; A61B 3/028; A61B 3/103
(Continued)

(56) References Cited

U.S. PATENT DOCUMENTS

| | | | | |
|---|---|---|---|---|
| 2011/0299034 A1* | 12/2011 | Walsh | ..................... | A61B 3/132 351/206 |
| 2014/0268060 A1* | 9/2014 | Lee | ......................... | A61B 3/103 351/241 |
| 2016/0317025 A1* | 11/2016 | Lee | ....................... | A61B 5/0022 |

FOREIGN PATENT DOCUMENTS

| | | |
|---|---|---|
| FR | 3050922 A1 | 11/2017 |
| JP | H09192100 A | 7/1997 |
| KR | 102149148 B1 | 8/2020 |

OTHER PUBLICATIONS

International Search Report for PCT/EP2022/051127 mailed Apr. 12, 2022, 4 pages.
(Continued)

*Primary Examiner* — Isiaka O Akanbi
(74) *Attorney, Agent, or Firm* — NIXON & VANDERHYE

(57) ABSTRACT

This system for assisting in determining a final optical prescription for a subject, includes:— at least one measurement device, intended to measure a set of refraction data;— an evaluation device, configured to propose at least one set of evaluation corrective lenses corresponding to an evaluation optical prescription, for the determination, by the subject, of the final optical prescription; the evaluation device determining the at least one proposed set of evaluation corrective lenses according to the set of measured refraction data. The measurement device includes the unit for producing an image encoding the set of measured refraction data, the evaluation device including the unit for reading the image, configured to obtain the set of measured refraction data from the read image.

18 Claims, 7 Drawing Sheets

(58) Field of Classification Search
USPC .................................................. 356/128, 138
See application file for complete search history.

(56) References Cited

OTHER PUBLICATIONS

Written Opinion of the ISA for PCT/EP2022/051127 mailed Apr. 12, 2022, 6 pages.
FR Search Report issued in FR Patent Application No. 2100523 dated Sep. 30, 2021.

* cited by examiner

Data Example of the ARK

ARK :
<R>  S     C      A
      -4,50  -0,75  158
<L>  S     C      A
      -4,50  -0,75  158

PD : 68 mm

SYSTEM FOR ASSISTING IN DETERMINING A FINAL OPTICAL PRESCRIPTION FOR A SUBJECT AND ASSOCIATED METHOD

CROSS-REFERENCE TO RELATED APPLICATIONS

This application is the US national stage of PCT/EP2022/051127, filed Jan. 19, 2022, which claims the priority of FR FR2100523, filed Jan. 20, 2021. The entire contents of each foregoing application are incorporated herein by reference.

BACKGROUND OF THE INVENTION

Field of the Invention

The present invention relates to a system for assisting in the determination of a final optical prescription for a subject, comprising:
at least one measurement device, intended to measure a set of refraction data from the eyes of the subject or corrective lenses, and
an evaluation device, configured to propose at least one set of evaluation corrective lenses to a practitioner, for the subject, each set of evaluation corrective lenses corresponding to an evaluation optical prescription, for determination, by the subject, of the final optical prescription, from the proposed at least one set of evaluation corrective lenses,
the evaluation device determines the at least one set of proposed evaluation corrective lenses as a function of the set of measured refraction data.

Description of the Related Art

In the field of optical prescription, practitioners generally use a system comprising several distinct devices to determine a final optical prescription for a subject.

In particular, this system comprises devices for objective measurement of a physical parameter on corrective lenses for a subject, if the subject already wears lenses, and/or devices for direct measurement on the eyes of the subject.

The measured value(s) generally form(s) a set or sets of refraction data for approximating the appropriate optical prescription for the subject.

Such a system also comprises at least one subjective evaluation device, in which the subject determines by at least one trial of evaluation corrective lenses which corrective lenses are the most appropriate for correcting their eyesight while ensuring their comfort, thus allowing the final optical prescription to be determined.

In order to limit the number of trials required to determine the final optical prescription, it is common practice to use one or more objective measurement devices to determine at least one set of refraction data, then to use this set of refraction data in the subjective evaluation device, in order to quickly propose to the subject the evaluation corrective lenses likely to be suitable for correcting their sight.

With the development of computer technologies, the transfer of refraction data from objective measurement devices to subjective evaluation devices has been simplified. It is now common practice to use systems comprising servers for data exchange between the measurement and evaluation devices.

However, such systems are not entirely satisfactory. The installation of exchange servers is complex and costly. Furthermore, such a system relies on a computer network which, if it breaks down, risks preventing any optical prescription.

SUMMARY OF THE INVENTION

One aim of the invention is therefore to propose a system for assisting the determination of a final optical prescription for a subject that is uncomplicated, inexpensive and robust, while remaining practical to use for the practitioner.

To this end, the invention has as its object, a system as aforesaid in which the measurement device comprises the means for producing an image encoding the set of measured refraction data, the evaluation device comprising the means for reading the image, configured to obtain the measured refraction data set from the read image.

A system comprising a measurement device comprising the means for producing an image encoding a set of refraction data on the one hand, and comprising an evaluation device comprising the means for reading the image on the other hand, facilitates the transmission of refraction data from the measurement device to the evaluation device easily, while ensuring robustness of transmission, without the need for a costly infrastructure.

In other advantageous aspects of the invention, the system for assisting in determining a final optical prescription for a subject comprises one or more of the following features, taken alone or in any technically possible combination:
the image production means comprises a printer, the image being printed on a sheet;
the image is a QR code;
the image corresponds to an encoded message corresponding to the set of measured refraction, the means for reading the image being configured to decode the encoded message to obtain the set of measured refraction data;
the set of measured refraction data comprises a sphere value representative of a myopia or hyperopia power, a cylinder value representative of an astigmatism power and an axis value representative of an astigmatism axis;
the evaluation device comprises a control unit and an evaluation unit, the control unit being movable relative to the evaluation unit and comprising means for reading the image, the control unit being configured to transmit to the evaluation unit information characterizing the at least one set of evaluation corrective lens to be proposed;
the measurement device is an autorefractometer for measuring a set of refraction data from the eyes of the subject, the evaluation device being a refractor;
the measurement device is a lensometer for measuring a set of refraction data from the corrective lenses of the subject, the evaluation device comprising a refractor and an autorefractometer, the autorefractometer being intended to measure a complementary set of refraction data from the eyes of the subject, the evaluation device determining the at least one set of evaluation corrective lenses proposed as a function of the set of measured refraction data and the complementary set of measured refraction data; and
the system comprises two measurement devices:
a first measurement device being a lensometer intended to measure a first set of refraction data from the corrective lenses of a subject,
a second measurement device being an autorefractometer intended for measuring a second set of refraction data from the eyes of the subject, the evaluation device determining the at least one set of proposed evaluation corrective lenses as a function of the first and second sets of measured refraction data, each measurement device comprising the means for producing an image encoding the set of refraction data that said measurement device has measured, the means of image reading being configured to obtain the sets of measured refraction data from each of the images read.

The invention further relates to a method of determining a final optical prescription for a subject, comprising the following steps:

providing a system to assist in determining a final optical prescription for a subject as aforesaid;

measuring a set of refraction data from the eyes of the subject or corrective lenses of the subject by the measurement device;

producing an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, as a function of the set of measured refraction data.

BRIEF DESCRIPTION OF THE DRAWINGS

The invention will be better understood on reading the following description, given solely by way of non-limiting example and made with reference to the following figures, in which.

DETAILED DESCRIPTION

Figure 1:
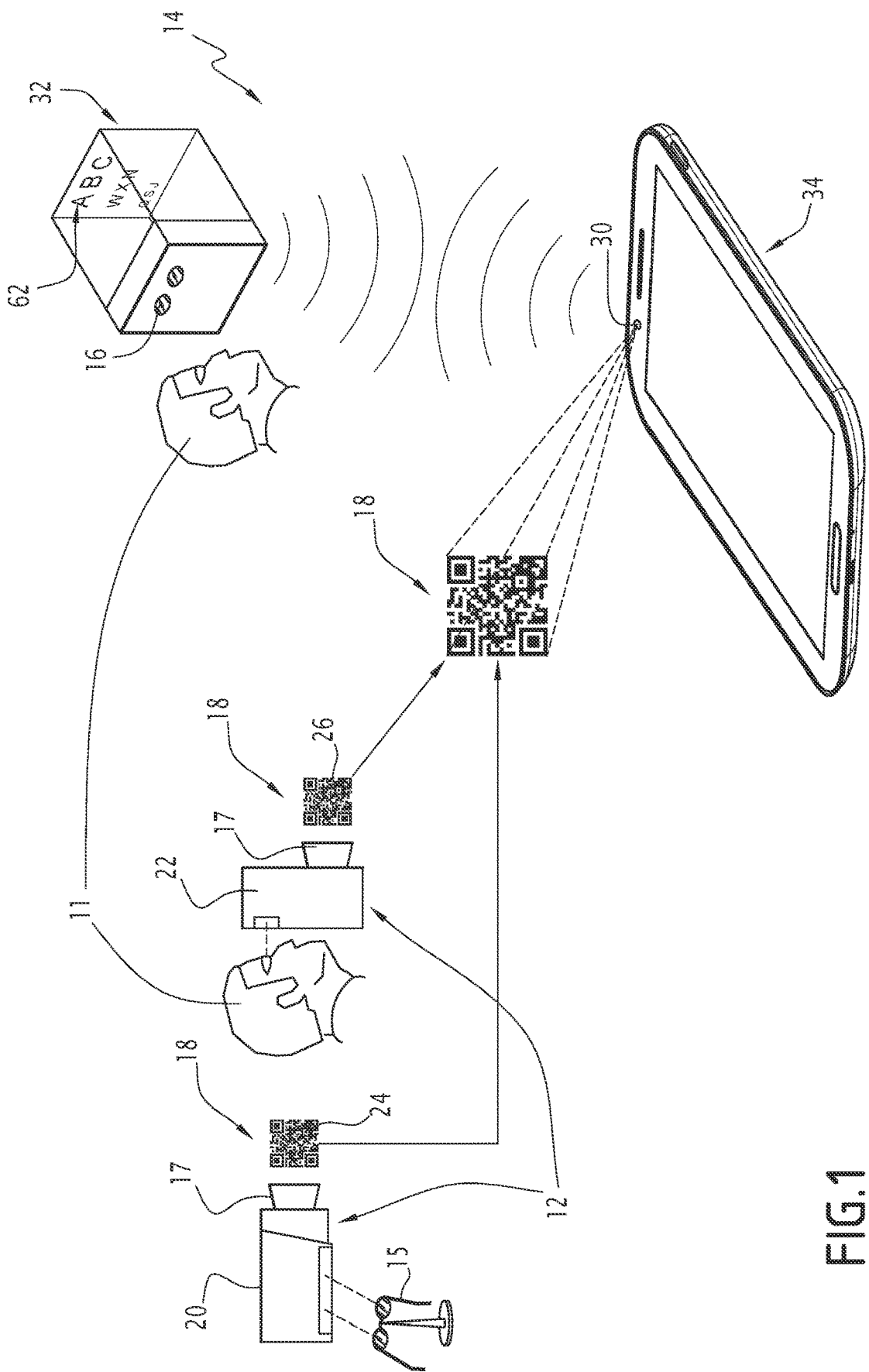
FIG. 1 is a schematic representation of various devices of an assistance system according to a first embodiment of the invention.
Figure 2:
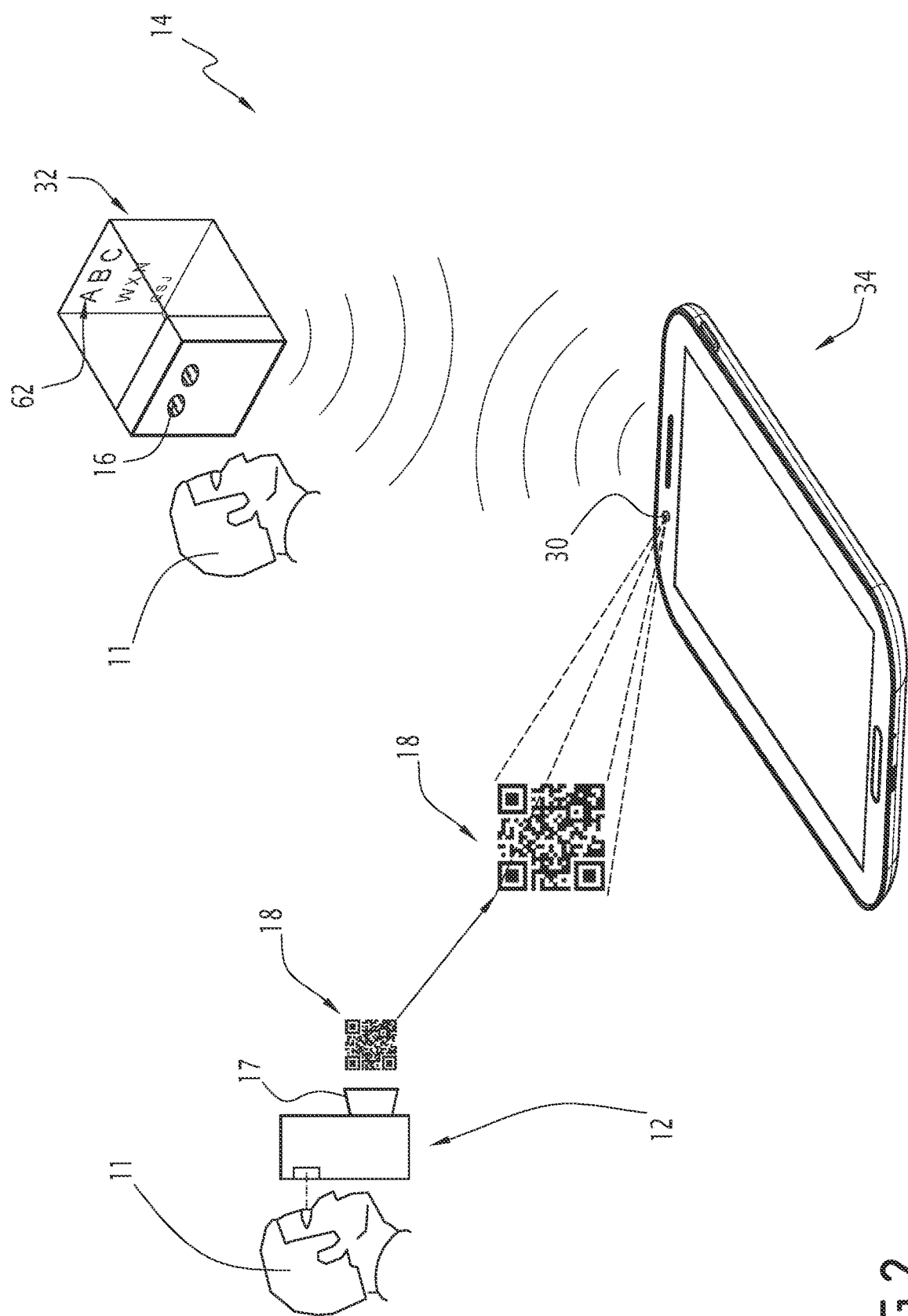
FIG. 2 is a schematic representation of various devices of an assistance system according to a second embodiment of the invention.
Figure 3:
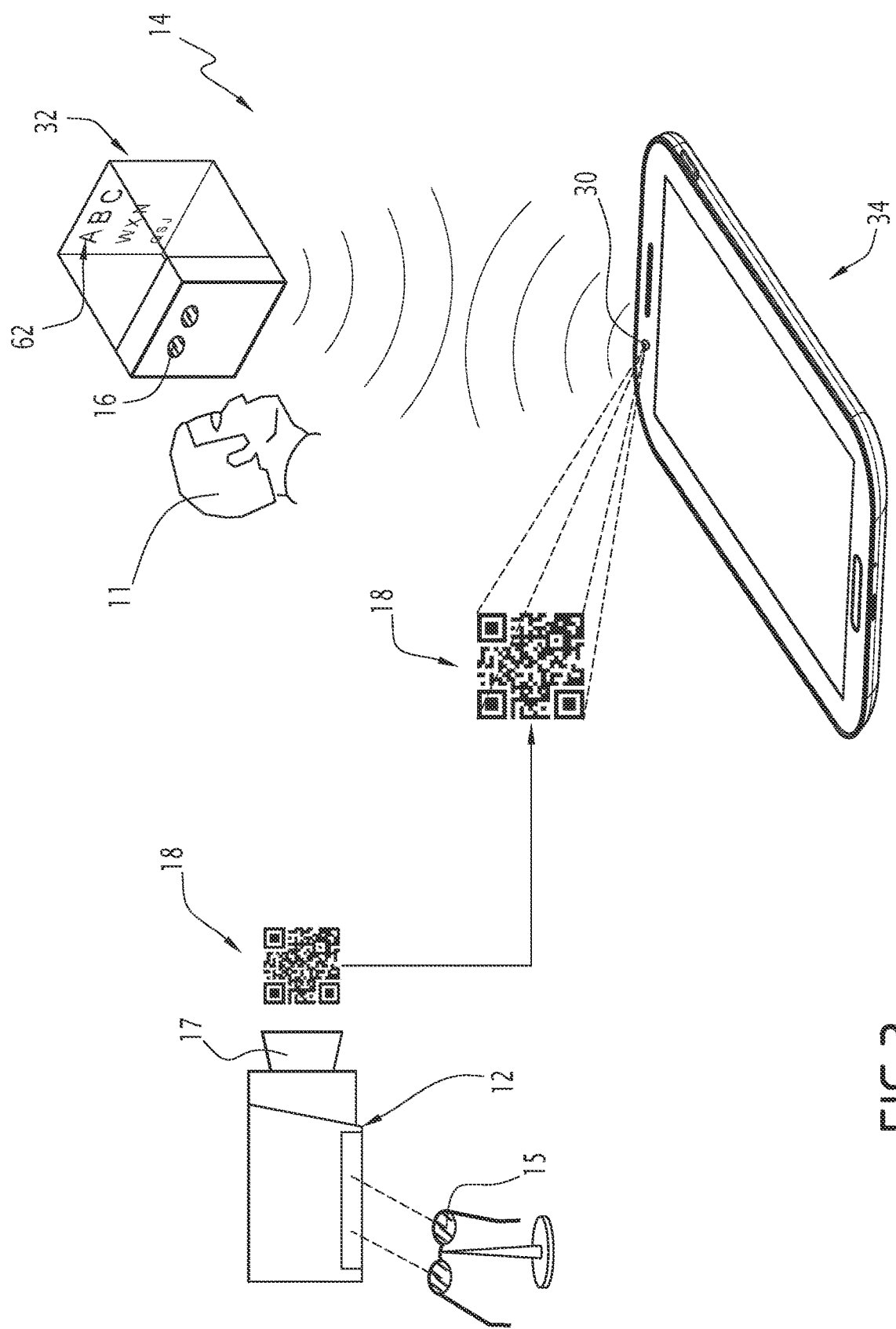
FIG. 3 is a schematic representation of various devices of an assistance system according to a third embodiment of the invention.

With reference to FIGS. 1 to 3, a system 10 for assisting in determining a final optical prescription for a subject 11 comprises at least one measurement device 12 and an evaluation device 14.

The system 10 for assisting in the determination of a final optical prescription for a subject 11, also referred to in the remainder of the description as prescription assistance system 10 or assistance system 10, is intended to be installed in a room (not shown) such as, for example, an ophthalmology practice, an optician or any other room or premises suitable for determining a final optical prescription for a subject 11.

The final optical prescription corresponds to a prescription for final corrective lenses to correct the eyesight of subject 11. In particular, the final optical prescription comprises all the information required to manufacture final corrective lenses configured to correct the eyesight of the subject 11.

The or each measurement device 12 is intended to objectively measure a set of refraction data from the eyes of the subject 11 or from corrective lenses 15 of the subject. By the corrective lenses 15 of the subject here means corrective lenses existing prior to the determination of the final optical prescription, and which need to be renewed and/or changed, for example.

The set of measured refraction data comprises the refraction data representing the measured optical properties of the eyes of the subject 11 or of the corrective lenses 15 of the subject. The set of measured refraction data thus forms the result of an objective measurement of optical properties.

The set of measured refraction data comprises, for example, for each eye or each corrective lens of the subject, a sphere value, noted S, representative of a myopia or hyperopia power of the subject whose eyes or corrective lenses have been measured.

The set of measured refraction data comprises, for example, for each eye or each corrective lens of the subject, a cylinder value, noted C, representative of an astigmatic power of the subject whose eyes or corrective lenses have been measured.

The set of measured refraction data comprises, for example, for each eye or each corrective lens of the subject, an axis value, noted A, representative of an axis of astigmatism of the subject whose eyes or corrective lenses have been measured.

The set of measured refraction data comprises, for example, a pupillary distance value, noted PD, representative of the distance between the center of the pupils of the subject whose eyes or lenses have been measured. Alternatively, or additionally, the set of data comprises two half-pupillary distance values, denoted RDP or R and LDP or L, representative of the deviation between the center of the right and left pupils respectively of the subject, and the plane formed by the center of the nose of the subject.

The set of measured refraction data comprises, for example, an identifier, noted ID, allowing the measured refraction data to be associated with a measurement of the eyes or corrective lenses 15 of the subject 11, thus referencing the set of measured refraction data. 30

The measurement device 12 comprises the means 17 for producing an image 18, hereinafter also referred to as the means 17 of production.

In a preferred alternative, the means 17 of production comprises an encoding processor, able to create the image 18 based on the set of data, and a printer configured to print the image 18. According to this alternative, the image 18 is for example printed on a sheet, for example on a sheet of paper and/or a self-adhesive sheet. The printer is, for example, a thermal printer.

Alternatively, the means 17 of production comprises a display screen configured to display the image 18 generated by the encoding processor.

The image 18 encodes the set of refraction data measured by measurement device 12.

The image 18 is preferably a QR code, abbreviation for Quick Response Code. The image 18 is therefore a matrix of black blocks on a white background, forming a two-dimensional bar code.

The image 18 preferably corresponds to an encoded message corresponding to the set of measured refraction. The encoded message can then only be decoded by a device configured to decode the encoded message, for example using a decoding key. When the means 17 of production of the image 18 is configured to produce an encoded image, the evaluation device is configured to decode the encoded message as will be described later.

When the image 18 is a QR code and the image corresponds to an encoded message, the code formed by the image forms an encoded QR code, or a secured QR code, also abbreviated SQR code (Secured Quick Response Code).

The means 17 of production is configured, for example, to print/display the set of measured refraction data encoded by the image 18, alongside the image 18. Alternatively, the means 17 of production is configured only to print/display the image 18.

In the embodiment shown in FIG. 1, the system 10 comprises two measurement devices 12. A first measurement unit 20 is a lensometer, intended to measure a set of refraction data from the corrective lenses of the subject. A second measurement device 22 is an autorefractometer, intended to measure a second set of refraction data from the eyes of the subject 11.

Each measurement device 12 then comprises the means 17 for producing an image 18 encoding the set of refraction data measured by said measurement device 12.

Figure 4:
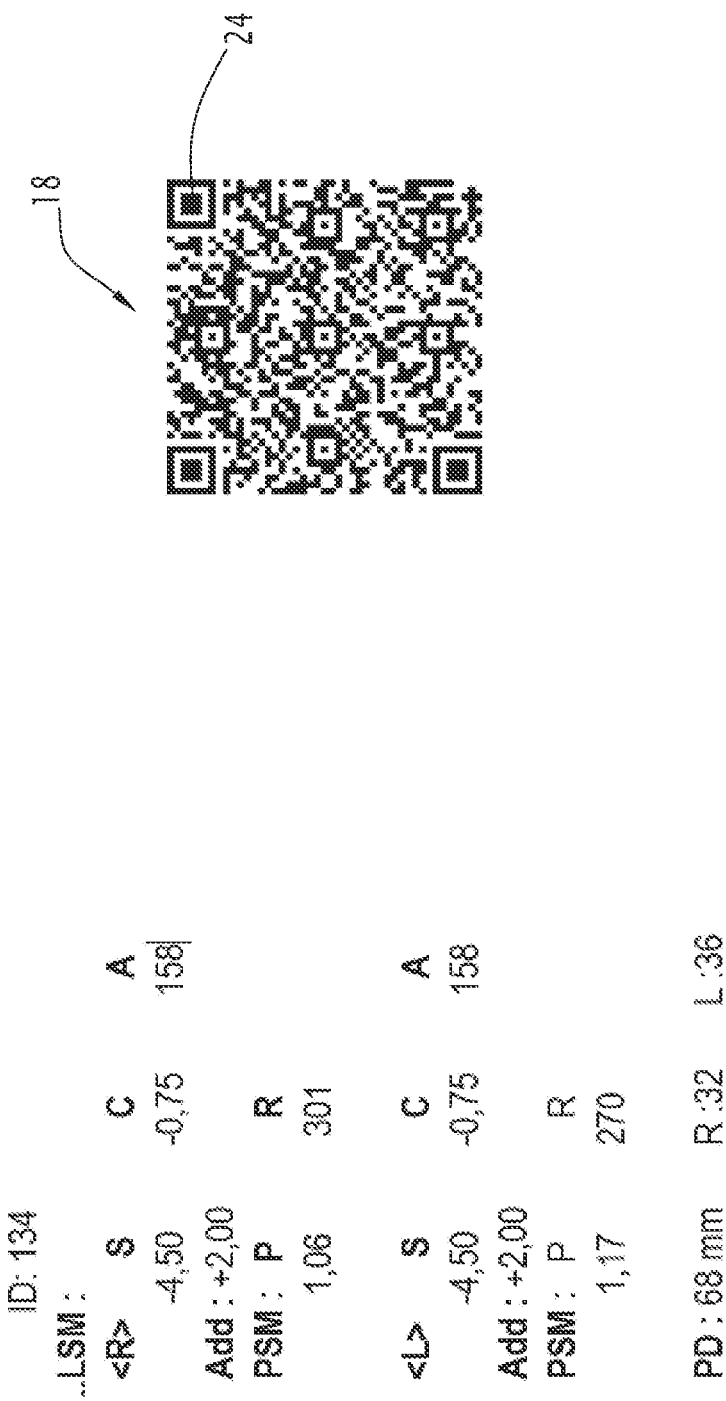
FIG. 4 shows a first set of refraction data and an image corresponding to the first set of refraction data.

The means 17 for producing an image 18 of the first measurement unit 20 is configured to produce a first image 24 encoding a first set of refraction data measured by the first measurement unit 20. FIG. 4 shows an example of a first set of data, on the left of the figure, and an example of a first image 24, encoding the first set of measured refraction data, on the right of the figure.

Figure 5:
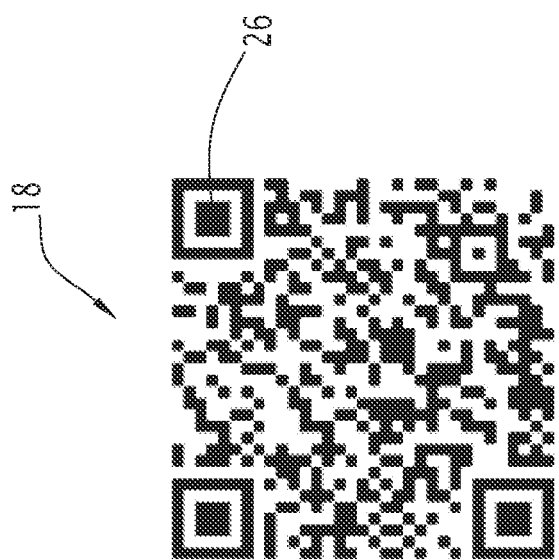
FIG. 5 shows a second set of refraction data and an image corresponding to the second set of refraction data.

The means 17 for producing an image 18 of the second measurement device 22 is configured to produce a second image 26 encoding a second set of measured refraction data. FIG. 5 shows an example of a second set of data, on the left of the figure, and an example of a second image 26, encoding the second set of measured refraction data, on the right of the figure.

The evaluation device 14 is configured to propose at least one set of evaluation corrective lenses 16 to a practitioner (not shown), for the subject 11, each set of evaluation corrective lenses 16 corresponding to an evaluation optical prescription.

The evaluation device 14 is configured, for example, to display information characterizing the evaluation corrective lenses 16 to the practitioner, the practitioner proposes, by means of the evaluation device 14, and for example in turn, the evaluation corrective lenses 16 to the subject.

The evaluation device 14 is configured to allow the subject to determine a final optical prescription, from the at least one set of evaluation corrective lenses 16 proposed.

The evaluation device 14 comprises, for example, a refractor, also known as a "phoropter". In the embodiment shown in FIG. 1, the evaluation device is a refractor.

The evaluation device 14 comprises the means 30 for reading the image 18.

The evaluation device 14 comprises, for example, an evaluation unit 32 and a control unit 34.

The control unit 34 comprises, for example, the means 30 for reading the image 18 and a control module 40.

In one particular alternative, the control unit 34 is movable relative to the evaluation unit 32.

The control unit 34 is, for example, connected to the evaluation unit 32 with the help of a wireless connection. The wireless connection is a data exchange connection, for example of the Bluetooth type.

The control unit 34 is, for example, a tablet or a smartphone.

The means 30 for reading the image 18 is configured to read the image 18 and is, in particular, configured to obtain the set of refraction data measured by the measurement device 12, from the read image 18.

The means 30 for reading the image 18 comprises, for example, or is connected to, a photographic sensor, and is configured to acquire the data representative of the image 18. The means 30 for reading the image 18 is further configured to interpret the data representative of the image 18 and to obtain the set of refraction data from this data representative of the image 18.

When the image 18 corresponds to an encoded message, the means 30 for reading the image is configured, for example, to decode the encoded message to obtain the set of measured refraction data.

The means 30 for reading comprises, for example, a module 42 for acquiring the image and a module 44 for interpreting the image 18, the acquisition module 42 being configured to obtain data representative of the image 18 and the interpretation module 44 being configured to interpret the data representative of the image 18.

In the embodiment shown in FIG. 1, according to which a first measurement unit 20 produces a first image 24 corresponding to a first set of refraction data and a second measurement device 22 produces a second image 26 corresponding to a second set of refraction data, the means 30 of reading the image is configured to obtain the sets of measured refraction data from each of the images 24, 26 read.

The control module 40 is configured to determine at least one set of evaluation corrective lenses 16, from the set of measured refraction data read by the means 30 of reading the image 18. The evaluation device 14 thus determines the at least one set of evaluation corrective lenses 16 proposed to the subject 11 as a function of the set of measured refraction data.

In the embodiment shown in FIG. 1, the control module 40, and thus, the evaluation device 14, determines the at least one set of evaluation corrective lenses 16 proposed as a function of the first and second sets of measured refraction data.

The control unit 34 is configured, for example, to determine information characterizing the at least one set of evaluation corrective lenses to be proposed from the sets of measured refraction data. The control unit 34 is configured, for example, to transmit to the evaluation unit 32, for example by means of the control module 40 of the control unit 34, the information characterizing the at least one set of evaluation corrective lenses 16 to be proposed.

Figure 7:
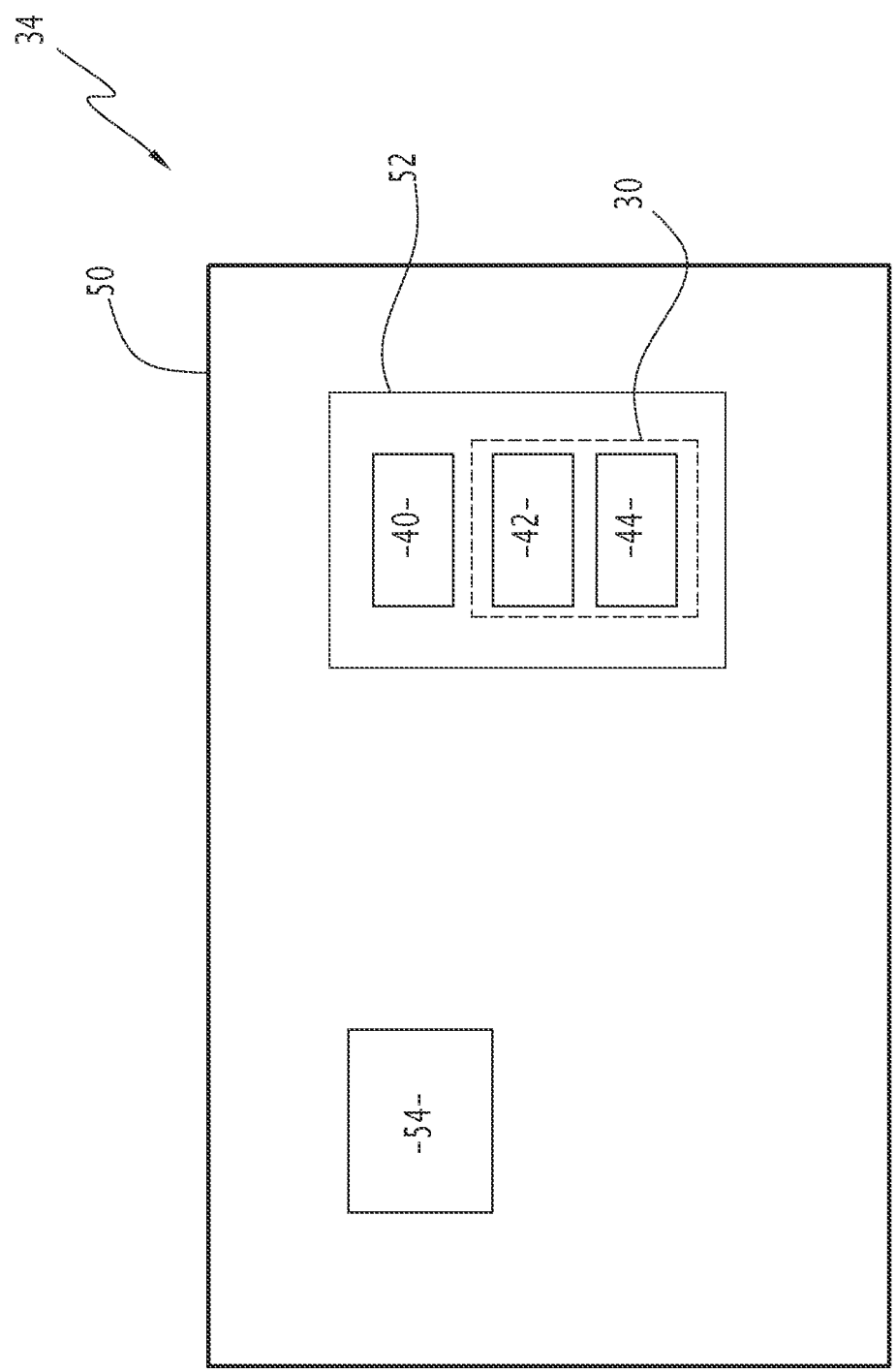
FIG. 7 is a schematic representation of a control unit of a system evaluation device as shown in FIGS. 1 to 3.

In a particular embodiment, as shown in FIG. 7, the control unit 34 comprises an information processing unit 50 consisting, for example, of a memory 52 associated with a processor 54.

The control module 40, and preferably the acquisition module 42 and the interpretation module 44, are each realized in the form of software executable by the processor 54. The memory 52 is then able to store image acquisition software, image interpretation software and control software. The processor 54 of the information processing unit 50 is then able to execute the control software, the acquisition software and the interpretation software.

Alternatively, the acquisition module 42, the interpretation module 44 and the control module 40 are each realized in the form of a programmable logic component, such as an FPGA (Field Programmable Gate Array), or as a dedicated integrated circuit, such as an ASIC (Application Specific Integrated Circuit).

When the control module 40, the acquisition module 42 and the interpretation module 44 are implemented in the form of one or more software programs, in other words, in the form of a computer program, it is also able to be recorded on a computer-readable medium (not shown). The computer-readable medium is, for example, a medium capable of storing electronic instructions and able to be coupled to a bus of a computer system. By way of example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the readable medium.

The evaluation unit 32 comprises at least one set of evaluation corrective lenses 16, and comprises, for example, a reception region 62 of the at least one set of evaluation corrective lenses and a display region 64.

The evaluation unit 32 comprises, for example, a plurality of evaluation corrective lenses, which when positioned in the reception region 62 form a set of evaluation corrective lenses 16.

The evaluation unit 32 is configured to propose at least one set of evaluation corrective lenses as a function of the information characterizing the at least one set of evaluation corrective lenses 16 to be proposed, having been transmitted by the control unit 34. The evaluation unit 32 is thus configured to place the evaluation corrective lenses in the reception region 62, in order to form the at least one set of evaluation corrective lenses, as a function of the information characterizing the at least one set of evaluation corrective lenses 16 to be proposed.

When several sets of evaluation corrective lenses 16 are proposed, the evaluation unit 32 is configured, for example, to propose the sets of evaluation lenses one after the other, allowing the subject sitting facing the reception region to test each of these sets of evaluation corrective lenses 16 successively.

As illustrated in FIGS. 1 to 3, the display region 62, for example, extends opposite the reception region of the at least one set of evaluation corrective lenses, in particular so that a subject sitting facing the reception region observes the display region 62 through the proposed set of evaluation corrective lenses 16.

The display region 62 comprises, for example, a Monoyer scale as illustrated in FIGS. 1 to 3.

The evaluation device thus allows the subject 11 to subjectively evaluate the correction of each of the proposed evaluation corrective lenses 16, thus allowing to determine which of the proposed evaluation corrective lenses is the most suitable and thus allowing to determine the final optical prescription, corresponding to the proposed evaluation corrective lenses 16 found to be the most suitable.

Figure 6:
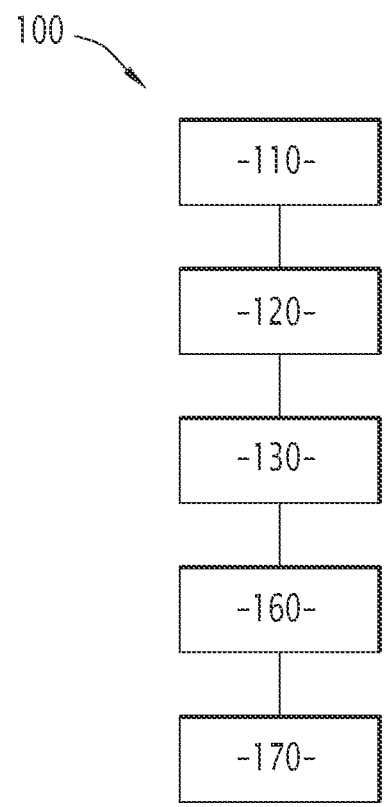
FIG. 6 is a flow chart of a prescription determination method according to the invention.

With reference to FIG. 6, a method 100 for the determination of a final optical prescription for a subject 11 will now be presented.

In a supply step 110, a subject 11 as previously described enters a room equipped with a system 10 to assist in determining a final optical prescription.

In a measurement step 120 following supply step 110, a practitioner activates the measurement device 12 to measure a set of refraction data from the eyes of the subject 11 or the corrective lenses 15 of the subject.

In particular, using the system 10 as shown in FIG. 1, a first set of refraction data is measured by a first measurement unit 20, being a lensometer, from the corrective lenses 15 of the subject and a second set of refraction data is measured by a second measurement device 22, being an autorefractometer, from the eyes of the subject 11.

During a production step 130, an image 18 corresponding to the set of refraction data measured by the measurement device 12 is produced, for example by the means 17 of production.

In particular, using the system 10 as shown in FIG. 1, a first image 24, corresponding to the first set of measured refraction data, and a second image 26, corresponding to the second set of measured refraction data, are produced respectively by the means 17 of production of the first 20 and second 22 measurement units.

During a reading step 160, the practitioner brings the image 18 into the vicinity of the means 30 of reading the evaluation device 14. The evaluation device 14 reads the image 18 to obtain the set of measured refraction data from the image 18 read.

Using the system 10 as shown in FIG. 1, the evaluation device 14 reads the first image 24 to obtain the first set of refraction data and reads the second image 26 to obtain the second set of refraction data. A practitioner may, for example, move the first image 24, the second image 26 and/or the evaluation device 14, to bring the first image 24 and the second image 26 successively or simultaneously in front of the means 30 of reading of the evaluation device 14, in order to allow or instruct the evaluation device 14 to read the first image 24 and the second image 26.

During a proposition step 170, following the reading step 160, the evaluation device 14 proposes to the practitioner at least one set of evaluation corrective lenses 16 for the subject 11 as a function of the set of measured refraction data.

When the evaluation device 14 comprises a distinct evaluation unit 32 and a control unit 34, as in the example shown in FIGS. 1 to 3, the control unit 34 generates, for example, information characterizing the at least one set of evaluation corrective lenses 16 to be proposed from the image 18. The control unit 34 transmits, preferably by wireless link, the information characterizing the at least one set of evaluation corrective lenses 16 to be proposed to the evaluation unit 32.

In particular, using the system 10 as presented in FIG. 1, the evaluation device 14 proposes at least one set of evaluation corrective lenses to the practitioner, for the subject 11, as a function of the first and second sets of measured refraction data. The control unit 34 generates, for example, information characterizing the at least one set of evaluation corrective lenses 16 to be proposed from the first image 24 and the second image 26.

The evaluation device 14 allows the practitioner to propose a set of evaluation corrective lenses to a subject or allows the practitioner to propose successive sets of corrective lenses, the set or the sets of corrective lenses being proposed as a function of the set or sets of measured refraction data.

The embodiment shown in FIG. 2 will now be described in detail. Only those elements that differ from the previously described embodiment shown in FIG. 1 are presented. Similar elements have the same references.

According to this embodiment, the system 10 comprises only one measurement device 12. The measurement device 12 is an autorefractometer intended to measure a set of refraction data from the eyes of the subject. The measurement device 12 then produces an image 18 encoding the set of measured refraction data from the eyes of the subject 11.

The evaluation device 14 is preferably a refractor and proposes the at least one set of corrective lenses as a function of said set of measured refraction data.

The embodiment described in FIG. 3 will now be presented in detail. Only those elements that differ from the previously described embodiments shown in FIGS. 1 and 2 are presented. Similar elements bear the same references.

According to this embodiment, the system comprises only one measurement device 12. The measurement device 12 is a lensometer intended to measure a set of refraction data from the corrective lenses 15 of the subject. The measurement device 12 then produces an image 18 encoding the set of measured refraction data from the corrective lenses 15 of the subject 11.

According to this embodiment, the evaluation device 14 comprises a refractor and an autorefractometer. The autorefractometer of the evaluation device 14 is, for example, intended to measure a complementary set of refractive data from the eyes of the subject 11.

The evaluation device 14 then determines the at least one set of refraction data as a function of the set of refraction data measured by the lensometer and as a function of the complementary set of refraction data measured by the autorefractometer of the evaluation device.

The use of an assistance system 10 in which the means 17 for producing an image 18 encodes a set of measured refraction data, and the means 30 for reading the image 18 are configured to obtain the set of measured refraction data from the read image 18 is particularly advantageous for allowing the easy transmission of data without calling on a complex IT infrastructure.

The use of a printer is particularly advantageous for simply producing the image 18, as a printed image can be stored for a long time and can easily be moved between the measurement device 12 and the evaluation device 14.

A QR code allows to ensure that the image 18 can be easily read by the evaluation device 32.

An image 18 corresponding to an encoded message ensures the confidentiality of the set of refraction data encoded by the image, which is of particular interest when the refraction data encoded by the image 18 corresponds to refraction data relative to a subject 11.

A set of refraction data comprising the sphere, cylinder and axis values forms an accurate set of refraction data and thus allows the evaluation device 14 to propose a particularly relevant set or sets of evaluation corrective lenses.

A system 10 in which the measurement device is an autorefractometer allows to adapt the at least one proposed set of evaluation corrective lenses 16 to the real eyesight of the subject 11.

A system in which the evaluation device 14 comprises a refractor, comprising a refractor and an autorefractometer is particularly interesting since it allows a set of refraction data to be measured from the eyes of a subject 11 and evaluation corrective lenses 16 to be proposed from a single evaluation device 14.

A system comprising two measurement units 20, 22 is advantageous for accurately selecting the set of evaluation corrective lenses 16 proposed to the practitioner, for the subject 11, while distributing the steps for determining a final optical prescription over three separate units 20, 22, 14, allowing, for example, to better manage the flow of subjects 11 whose final optical prescription is to be determined.

The invention claimed is:

1. A system for assisting in determining a final optical prescription for a subject, comprising:
   at least one measurement device configured to objectively measure a set of refraction data on eyes of the subject or on corrective lenses of the subject, said set of refraction data comprising at least one of:
   for each said eye or each said corrective lens of the subject, a sphere value representative of a myopia or hyperopia power of the eye or the corrective lens;
   for each said eye or each said corrective lens of the subject, an axis value representative of an axis of astigmatism of the eye or the corrective lens;
   a pupillary distance value representative of the distance between a center of pupils of the eyes of the subject;
   two half-pupillary distance values representative of a deviation between the center of the right and left pupils respectively of the eyes of the subject, and a plane formed by a center of a nose of the subject; and
   an identifier allowing the measured refraction data to be associated with a measurement of the eyes or corrective lenses of the subject;
   an evaluation device, configured to propose at least one set of evaluation corrective lenses for the subject to a practitioner, each said set of evaluation corrective lenses corresponding to an evaluation optical prescription, for determination, by the subject, of a final optical prescription, from the at least one proposed set of evaluation corrective lenses,
   the evaluation device determining the at least one proposed set of evaluation corrective lenses as a function of the measured set of refraction data,
   wherein the at least one measurement device comprises a means for producing an image encoding the set of measured refraction data and for transmitting said image from the at least one measurement device to the evaluation device, said means for producing an image comprising at least an encoding processor, configured to create the image based on the set of measured refraction data,
   the evaluation device comprising a means for reading the image, configured to obtain the set of measured refraction data from the read image.

2. The system according to claim 1, wherein the means for producing the image comprises a printer, the image being printed on a sheet.

3. A method of determining a final optical prescription for a subject, comprising:
   providing the system for assisting in determining a final optical prescription for a subject of claim 2;
   measuring a set of refraction data from the eyes of the subject or corrective lenses of the subject by the measurement device;
   generating an image corresponding to the set of refraction data measured by the measurement device;
   reading the image by the evaluation device to obtain the set of measured refraction data from the read image; and
   proposing at least one set of evaluation corrective lenses to a practitioner, for the subject, by the evaluation device, according to the set of measured refraction data.

4. The system according to claim 1, wherein the image is a QR code.

5. A method of determining a final optical prescription for a subject, comprising:
   providing the system for assisting in determining a final optical prescription for a subject of claim 4;
   measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

6. The system according to claim 1, wherein the image corresponds to an encoded message corresponding to the measured set of measured refraction data, the means for reading the image being configured to decode the encoded message to obtain the set of measured refraction data.

7. A method of determining a final optical prescription for a subject, comprising:

providing the system for assisting in determining a final optical prescription for a subject of claim 6;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

8. The system according to claim 1, wherein the set of measured refraction data comprises:

a sphere value representative of a myopia or hyperopia power;

a cylinder value representative of an astigmatism power; and an axis value representative of an astigmatism axis.

9. A method of determining a final optical prescription for a subject, comprising:

providing the system for assisting in determining a final optical prescription for a subject of claim 8;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

10. The system according to claim 1, wherein the evaluation device comprises:

a control unit; and an evaluation unit, wherein the control unit is movable relative to the evaluation unit and further comprises means of reading the image, the control unit being configured to transmit to the evaluation unit information characterizing the at least one set of evaluation corrective lenses to be proposed.

11. A method of determining a final optical prescription for a subject, comprising:

providing the system for assisting in determining a final optical prescription for a subject of claim 10;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

12. The system according to claim 1, wherein the at least one measurement device comprises an autorefractometer configured to measure a set of refraction data from the eyes of the subject, the evaluation device being a refractor.

13. A method of determining a final optical prescription for a subject, comprising:

providing the system for assisting in determining a final optical prescription for a subject of claim 12;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

14. The system according to claim 1 wherein the at least one measurement device comprises a lensometer configured to measure a set of refraction data from the corrective lenses of the subject, the evaluation device comprising a refractor and an autorefractometer, the autorefractometer being configured to measure a complementary set of refraction data from the eyes of the subject, the evaluation device determining the at least one proposed set of evaluation corrective lenses as a function of the set of measured refraction data and the complementary set of measured refraction data.

15. A method of determining a final optical prescription for a subject, comprising:

providing the system for assisting in determining a final optical prescription for a subject of claim 14;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

16. The system according to claim 1, wherein the at least one measurement device comprises:

a first measurement device being a lensometer configured to measure a first set of refraction data from the corrective lenses of the subject; and a second measurement device being an autorefractometer configured to measure a second set of refraction data from the eyes of the subject, wherein the evaluation device is configured to determine the at least one proposed set of evaluation corrective lenses as a function of the first and second sets of measured refraction data, each of the first and second measurement devices comprising the means for producing an image encoding the set of refraction data that said measurement device has measured, the means for reading the image being configured to obtain the sets of measured refraction data from each of the images read.

17. A method of determining a final optical prescription for a subject, comprising:

providing the system for assisting in determining a final optical prescription for a subject of claim 16;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

18. A method of determining a final optical prescription for a subject, comprising:

providing the system for assisting in determining a final optical prescription for a subject of claim 1;

measuring a set of refraction data from the eyes of the subject or corrective lenses of the subject by the measurement device;

generating an image corresponding to the set of refraction data measured by the measurement device;

reading the image by the evaluation device to obtain the set of measured refraction data from the read image; and proposing at least one set of evaluation corrective lenses to a practitioner, for the subject, by the evaluation device, according to the set of measured refraction data.

* * * * *